(12) United States Patent
Yin et al.

(10) Patent No.: US 9,025,113 B2
(45) Date of Patent: May 5, 2015

(54) DISPLAY PANEL WITH PATTERNED COLOR FILTER LAYER HAVING POROUS STRUCTURE

(71) Applicant: AU Optronics Corp., Hsin-Chu (TW)

(72) Inventors: Hsueh-Min Yin, Hsin-Chu (TW); Hsin-Chang Huang, Hsin-Chu (TW); Jung-Hsiang Lin, Hsin-Chu (TW); Shen-Yi Huang, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 136 days.

(21) Appl. No.: 13/888,390

(22) Filed: May 7, 2013

(65) Prior Publication Data

US 2013/0242240 A1 Sep. 19, 2013

Related U.S. Application Data

(62) Division of application No. 12/591,172, filed on Nov. 12, 2009, now Pat. No. 8,462,311.

(30) Foreign Application Priority Data

Mar. 18, 2009 (TW) .............................. 98108823 A

(51) Int. Cl.
  *G02F 1/1335* (2006.01)
  *H01J 9/50* (2006.01)
  *G02F 1/13* (2006.01)

(52) U.S. Cl.
  CPC ............. *G02F 1/133514* (2013.01); *H01J 9/50* (2013.01); *G02F 1/1309* (2013.01)

(58) Field of Classification Search
  CPC ............ G02F 1/133516; G02F 1/1309; G02F 1/136259
  USPC .......................................... 349/106–109, 192
  See application file for complete search history.

(56) References Cited

U.S. PATENT DOCUMENTS

| | | | |
|---|---|---|---|
| 5,142,386 | A | 8/1992 | Ishihara |
| 5,926,246 | A | 7/1999 | Tomita et al. |
| 6,812,992 | B2 | 11/2004 | Nemeth |
| 2006/0181672 | A1 | 8/2006 | Son |
| 2009/0141231 | A1 | 6/2009 | Lim |

FOREIGN PATENT DOCUMENTS

| | | |
|---|---|---|
| CN | 101221299 | 7/2008 |
| JP | 2002303860 | 10/2002 |
| KR | 1020080065748 | 7/2008 |
| TW | 200628885 | 8/2006 |
| TW | 200712606 | 4/2007 |
| TW | 200829977 | 7/2008 |

*Primary Examiner* — Paisley L Arendt

(74) *Attorney, Agent, or Firm* — Winston Hsu; Scott Margo

(57) ABSTRACT

A display panel has a portion of a color filter or patterned color layer with a thickness of at least half of the cell gap of the display panel, wherein the repair method includes providing a energy light beam to the portion of the color filter or the patterned color layer in the sub-pixel region with a bright point defect to make the portion of the color filter or patterned color layer have porous structure so that bright point is repaired to become a grey point or a dark point.

5 Claims, 9 Drawing Sheets
(2 of 9 Drawing Sheet(s) Filed in Color)

DISPLAY PANEL WITH PATTERNED COLOR FILTER LAYER HAVING POROUS STRUCTURE

CROSS REFERENCE TO RELATED APPLICATIONS

This patent application is a divisional application and claims priority of U.S. patent application Ser. No. 12/591,172, filed on Nov. 12, 2009, which claims the foreign priority of Taiwan Pat. application Ser. No. 098108823, filed on Mar. 18, 2009, the entire contents of which are incorporated herein by reference.

BACKGROUND OF THE DISCLOSURE

1. Technical Field

The present disclosure relates to a display panel and a method for repairing a bright point; particularly to a method for repairing a bright point using an energy light beam which excites a color filter and the display panel with color filters of various thicknesses.

2. Description of Related Art

When comparing with a traditional non-flat display, such as a cathode ray tube (CRT) display, the flat display panel possesses light weight and thin profile characteristics. Such device has now become a mainstream in the display market, and is widely applied in televisions, monitors of personal computers, and portable electronic products such as cell phones, digital cameras, and music players.

Some of the most common display panels include liquid crystal displays (LCD), plasma displays, and electroluminance displays. In the case of LCD, it is comprised of an LCD panel and a backlight module. The backlight module is used to supply back-light for image displays. The LCD panel usually includes a color filter substrate, an array substrate, and a liquid crystal layer disposed between the color filter substrate and the array substrate. On the array substrate, a thin film transistor (TFT) serves as a switching device which electrically connects to a transparent pixel electrode on a surface of the array substrates. On the surface of the color filter substrate is a transparent common electrode layer, and a thin film color filter layer which displays colors such as red, blue, green, and etc. The theory behind the LCD panel is outputting a set voltage to each pixel electrode and the common electrode layer to control the rotational behaviors of liquid crystal molecules which adjusts the back-light source output, and displays the desired images.

However, during the manufacturing process of an LCD panel, any foreign matters, particles, or contaminants which adhere onto the color filter substrate or the array substrate, or are mixed in the liquid crystal layer, would affect the operation of the TFT by causing adjacent liquid crystal molecules to malfunction which become bright point (or dark point) defects on the display. Current pixel repairing methods use a laser blade to break the signals connecting to the TFTs or short circuit the TFT, turning a bright point defect on a sub-pixel region to a dark point or a black point. However, when the particle of the foreign matter is too large or the position of the foreign matter is too close to the wires of the array substrate, short circuiting the TFTs or breaking the signals connecting to the TFTs may still result in electric leakage via foreign matter, making the bright point defect repair ineffective. Also, prior art repairing methods cannot repair the bright point defect caused by surface scratches of the substrates as well as prevent the foreign matters from migrating to other sub-pixel regions after the repairs which introduces new bright point defects or shifts the existing bright point defects.

SUMMARY OF THE DISCLOSURE

The present disclosure provides a display panel and a method for repairing a bright point through applying energy light beams to the patterned color layer of a bright point defect. The energy light beam causes expansion of the patterned color layer which fills the cell gaps either completely or partially such that it lowers the transmittance of the liquid crystal layer and turns the bright point to a dark or a grey point. This method improves the effectiveness of repairing bright point defects in comparison to the laser blade signal cut-off method described above.

The present disclosure provides a method for repairing a bright point of a display panel. First provide a display panel, comprising a pair of substrates parallel and opposite to each other, a liquid crystal layer disposed between the pair of substrates, a color filter disposed on one of the pair of substrates, a transparent conductive layer and a liquid crystal alignment layer disposed on a patterned color layer in sequence. The pair of substrates at least includes a pixel region and the pixel region at least includes a first sub-pixel region and a second sub-pixel region. The color filter at least includes a first patterned color layer disposed in the first sub-pixel region, and a second patterned color layer disposed in the second sub-pixel region. Also, the thickness of the liquid crystal layer is defined as a cell gap. Moreover, according to the method for repairing a bright point of the present disclosure, when a bright point defect occurs at the first sub-pixel region, a repairing process upon the first sub-pixel region is performed, and the repairing process irradiates an energy light beam to the first patterned color layer to create a porous structure in the first patterned color layer between one of the pair of substrates and the transparent conductive layer, and causes an expansion in thickness of the first patterned color layer such that a thickness of the first patterned color layer expands to at least half of the cell gap.

The present disclosure provides another method for repairing an optoelectronic device, comprising the method for repairing a bright point of the display panel as mentioned above.

The present disclosure further provides another display panel, comprising a pair of substrates, a liquid crystal layer disposed between the pair of substrates, a color filter disposed on one of the pair of substrates, a transparent conductive layer and a liquid crystal alignment layer disposed on the color filter in sequence. The pair of substrates is disposed parallel and opposite to each other which at least includes a pixel region and the pixel region at least includes a first sub-pixel region and a second sub-pixel region. The thickness of the liquid crystal layer is defined as a cell gap. The color filter at least includes a first patterned color layer disposed in the first sub-pixel region, and a second patterned color layer disposed in the second sub-pixel region. The first patterned color layer disposed between the transparent conductive layer and one of the pair of the substrates has a porous structure. The thickness of the first patterned color layer is at least half of the cell gap and greater than the thickness of the second patterned color layer.

The present disclosure yet provides another optoelectronic device, comprising a display panel as described above.

These and other objectives of the present disclosure will no doubt become obvious to those of ordinary skill in the art after reading the following detailed description of the preferred embodiment that is illustrated in the various figures and drawings.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

DETAILED DESCRIPTION

Figure 1:
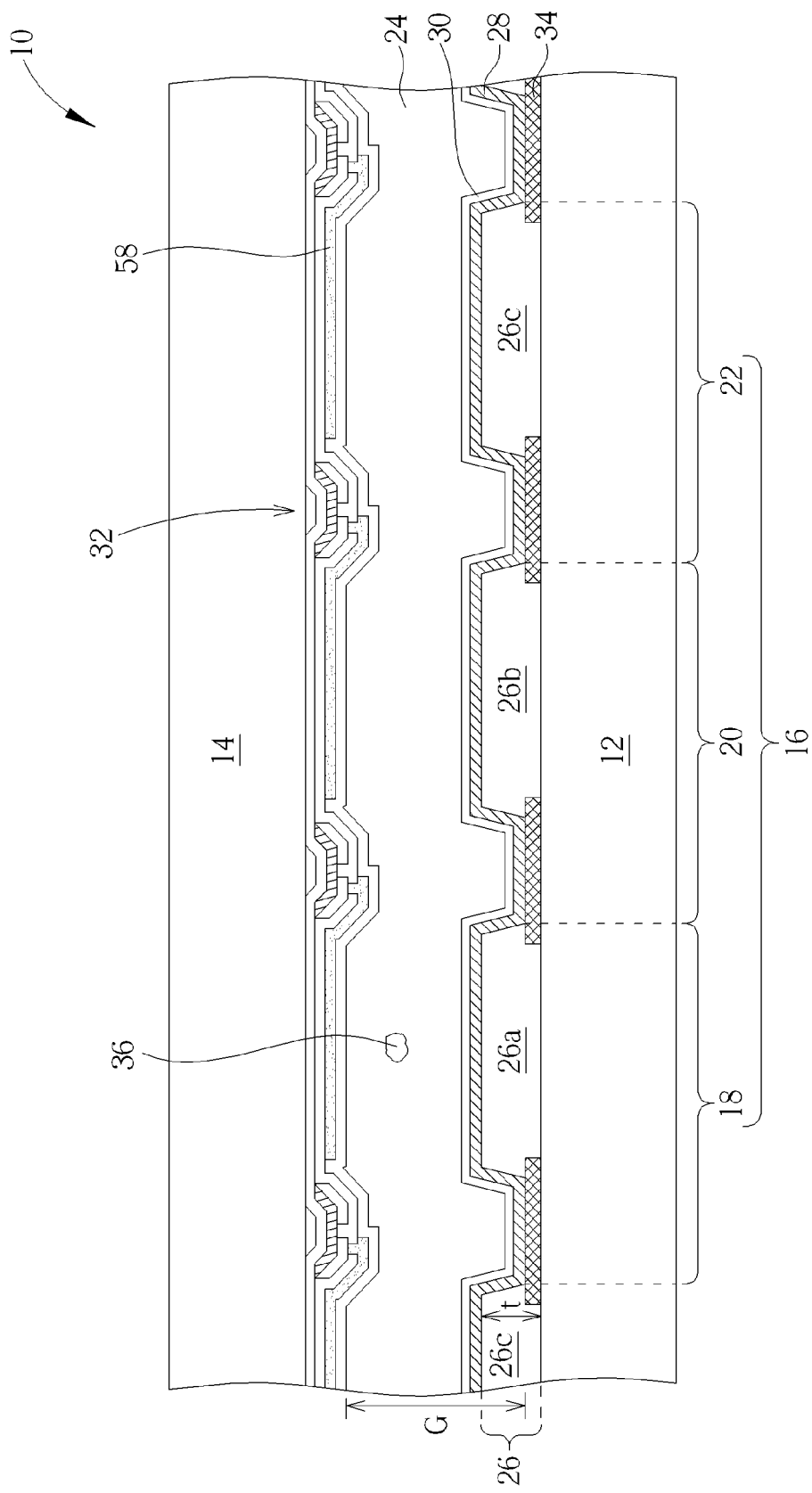
FIG. 1 is a cross-sectional view of a liquid display panel.

Referring to FIG. 1 is a cross-sectional view of a display panel 10. The display panel 10 includes a pair of substrates, namely a first substrate 12 and a second substrate 14. Generally, the first substrate 12 and the second substrate 14 act as a color filter substrate and an array substrate of the display panel 10 respectively. The first substrate 12 and the second substrate 14 include a plurality of pixel regions 16 (FIG. 1 only illustrates one pixel region 16), each of the pixel regions 16 at least include a first sub-pixel region 18 and a second sub-pixel region 20. In a preferred embodiment, the pixel region 16 further includes a third sub-pixel region 22 or a fourth sub-pixel region (not illustrated) or other appropriate number of sub-pixel regions, but is not limited. The display panel 10 further includes a liquid crystal layer 24 disposed between the first substrate 12 and the second substrate 14, a color filter 26 disposed on either an inner surface of the first substrate 12 or an inner surface of the second substrate 14, a transparent conductive layer 28 and a liquid crystal alignment layer 30 respectively disposed on a surface of the color filer 26 in sequence. The liquid crystal layer of the present disclosure may be replaced by an electrophoretic layer. In the present embodiment, the color filter 26 is disposed on the inner surface of the first substrate 12. The display panel 10 further includes a plurality of array units disposed on either a surface of the first substrate 12 or a surface of the second substrate 14. For example, the display panel 10 at least includes transistors 32 and pixel electrodes 58 corresponding to the first sub-pixel region 18 and the second sub-pixel region 20, and the transistors 32 and the pixel electrodes 58 are disposed on the inner surface of the second substrate 14. In the preferred embodiment, the plurality of array units further includes the transistor 32 and the pixel electrode 58 corresponding to the third sub-pixel region 22, but is not limited. In other words, a plurality of sub-pixel regions would result in a plurality of transistors and a plurality of pixel electrodes. The color filter 26 at least includes a first patterned color layer 26a and a second patterned color layer 26b disposed at the first sub-pixel region 18 and the second sub-pixel region 20 respectively; and preferably, the color filter 26 further includes a third patterned color layer 26c, disposed at the third sub-pixel region 22. In other embodiments, the patterned color layers of the color filter 26 also include colors on the color coordinates such as: white, brown, yellow, purple, pink, indigo, cyan, and etc; the quantity of the patterned color layer is not limited. For example, the first patterned color layer 26a, the second patterned color layer 26b, and the third patterned color layer 26c may represent a red patterned color layer, a green patterned color layer, and a blue patterned color layer respectively. In addition, the transparent conductive layer 28 acts as a common electrode. The thickness of the liquid crystal layer 24 is defined as a cell gap G. Preferably, the black matrix 34 is disposed between those neighboring first patterned color layer 26a, the second patterned color layer 26b and the third patterned color layer 26c. The black matrix 34 is preferably corresponding to each of the transistors 32.

When foreign contaminations occur during the manufacturing process of the display panel 10, such as a particle 36 appears in a region between the first substrate 12 and the second substrate 14 as shown in FIG. 1, a voltage drop or an abnormal rotational behavior of the liquid crystal molecules would occur, resulting in a bright point defect at the first sub-pixel region 18 where the particle 36 is present. Therefore, during the manufacturing process of the display panel 10, voltages are applied to the display panel 10 for checking if bright point defects exist. If any bright point defects are detected, a repairing process must proceed. According to the method for repairing a bright point of the present disclosure, an energy light beam is applied to the first patterned color layer 26a to cause expansions of the first patterned color layer 26a such that the expanded first patterned color layer 26a either completely or partially fills the liquid crystal layer 24.

Figure 2:
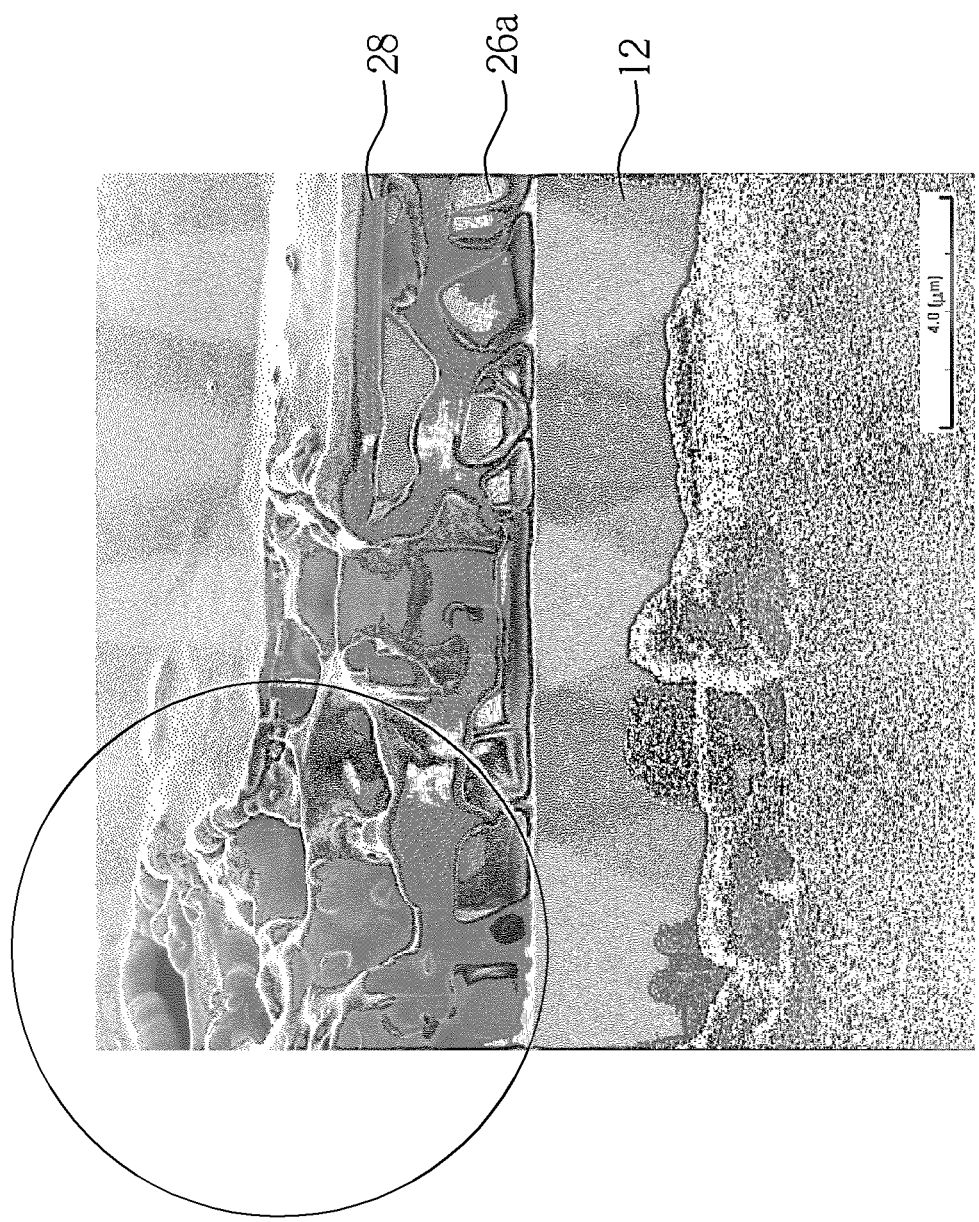
FIG. 2 is a FIB image of a color filter after applying a light beam of a laser.
Figure 3:
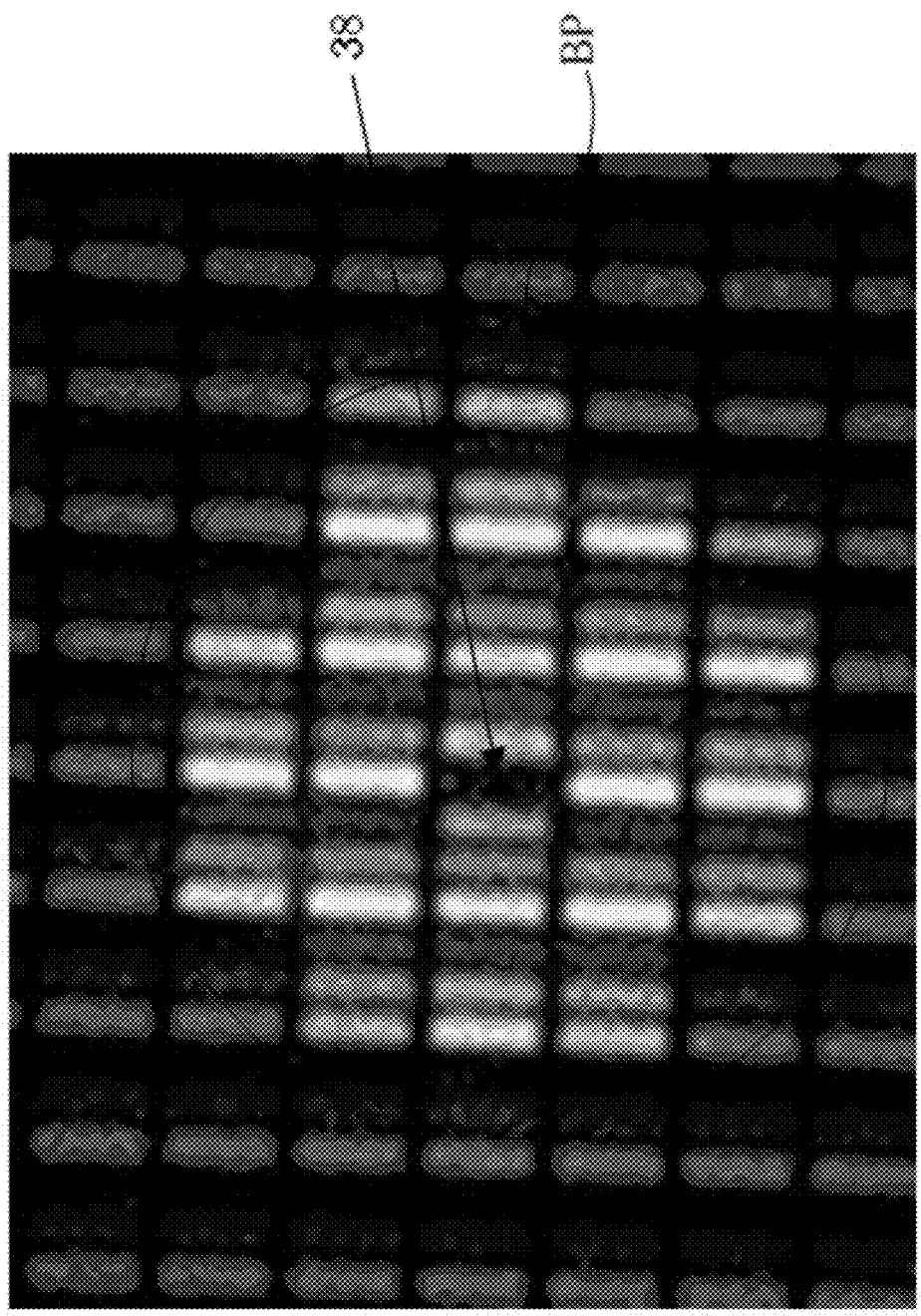
FIG. 3 is a top view of a patterned color filter of FIG. 2, after applying a light beam of a laser.

Referring to FIG. 2 and FIG. 3, FIG. 2 is a focus ion beam microscopy (FIB) image of a color filter after a light beam of the laser is applied, and FIG. 3 is a top view of a patterned color layer shown in FIG. 2 after the light beam of the laser is applied. For example, when repairing the first sub-pixel region 18 using the light beam of the laser, the light beam of the laser with a high energy is applied to the first patterned color layer 26a continuously for a long period of time which burns the surfaces of the first patterned color layer 26a or the surfaces of the transparent conductive layer 28, creating a shading effect through burning the surfaces black. Such shading effect turns the first sub-pixel region 18 into a dark point. In other words, without any filters, reflectors, or polarizers, the matter turns into black and could be detected by human eyes after the light beam of the laser with a high energy is applied. For example, the long time exposure is defined as having a pulse period over 200 microseconds (μs), or the laser with a high energy is defined as an energy above 0.01 millijoules (mJ) for each pulse. However, under these circumstances, as shown in FIG. 2, long term exposure under the light beam of the laser with a high energy causes the first patterned color layer 26a and the transparent conductive layer 28 to exhibit a brittle fracture or a peeling behavior which enables penetration of contaminants or particles into the liquid crystal layer 24, introducing new bright point defects at adjacent sub-pixel regions (as shown in the circled region of FIG. 3). For example, if peeling occurs at the transparent conductive layer 28 and its conductive materials are mixed with the liquid crystal layer 24, a voltage drop would occur at the liquid crystal layer 24, causing an abnormal rotational behavior of the liquid crystal molecules. As shown in FIG. 3, the burned and peeled first patterned color layer 26a of FIG. 2 is corresponding to the indicated dark point 38 in FIG. 3. Since the first patterned color layer 26a is burned by the light beam of the laser with a high energy, light is shielded and the corresponding first sub-pixel region 18 becomes a dark point 38. However, as stated earlier, contaminants caused by the fracture or peeling of the first patterned color layer 26a or the transparent conductive layer 28 would infiltrate adjacent sub-pixel regions, forming new bright point defects at the adjacent sub-pixel regions of the dark point 38, as indicated by BP in the circled region of the figure. Therefore, performing the repairing method using a light beam of the laser with a high energy and long term exposure to burn the patterned color layer could result in new bright point defects. Effectiveness of such repairing method requires further works on improvements.

Figure 4:
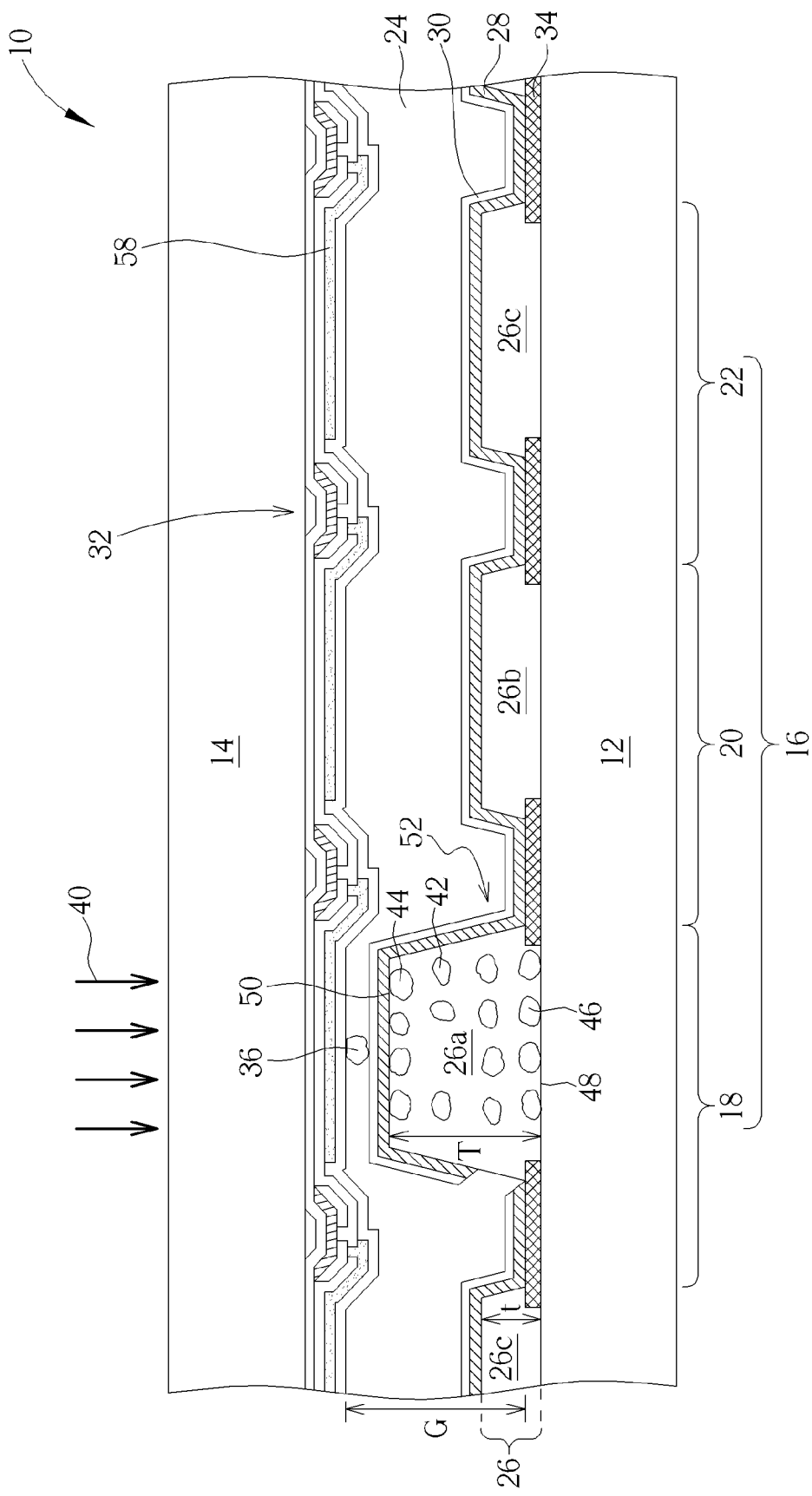
FIG. 4 is a cross-sectional schematic diagram of a display panel of the present disclosure.

Therefore, the present disclosure further focuses on the method for repairing a bright point which introduces a new energy light beam with a lower energy and a shorter time exposure for modifying the internal structure and thickness of the color filter to achieve an improved repairing effect. Referring to FIG. 4, FIG. 4 is a cross-sectional view of an embodiment of the display panel of the present disclosure. FIG. 4 reveals a pixel region structure of the display panel 10 in FIG. 1 after the method for repairing a bright point of the present disclosure is applied. According to the method for repairing a bright point of the present disclosure, when a bright point defect is detected at the first sub-pixel region 18 of FIG. 1, the required repairing process includes providing an energy light beam 40 to create a porous structures 42 in the first patterned color layer 26a between the first substrate 12 and the transparent conductive layer 30. The energy light beam 40 causes the thickness of the first patterned color layer 26a to expand to at least half of the cell gap G or increases the thickness of the first patterned color layer 26a by at least half or more than half of the cell gap G which is substantially thicker than the thicknesses of the second and the third patterned color layers 26b, 26c. As shown in FIG. 4, the color filter 26 without the exposure to the energy light beam 40 has a filter thickness t, shown in the third patterned color layer 26c, for example. The first patterned color layer 26a with the exposure to the energy light beam 40 has an color filter thickness T expanded to at least half of the cell gap G. After the repairing process, the first patterned color layer 26a partially or completely fills the relevant section of the liquid crystal layer 24, which decreases the cell gap of the first sub-pixel region 18, lowers the transmittance rate, and turns the first sub-pixel region 18 to a grey point or a dark point. Furthermore, the expanded first patterned color layer 26a also serves the purposes of extruding and holding the particle 36 in the first sub-pixel region 18, which effectively prevents the formation of any new bright point defects caused by migrations of contaminants.

In the present embodiment, the energy light beam 40 could irradiate from one side of the display panel 10 (or namely away from the color filter 26), meaning that the energy light beam 40 is irradiated from the top of the second substrate 14. The preferred focal point of the energy light beam 40 is at the first patterned color layer 26a, allowing the first patterned color layer 26a to expand and to form a porous structure. Nevertheless, in other embodiments, the energy light beam 40 may also irradiate from outside of the substrate with a color filter 26 disposed (first substrate 12) or irradiate from both sides of the first and second substrates 12, 14 simultaneously. Also, in a preferred embodiment, a single point heating range of the energy light beam 40 is from about 5E-6 joule (J) to about 5E-8 J, wherein the energy light beam 40 could be a laser light beam or a visible light beam, but is not limited. For example, the energy light beam 40 could be a pulsed laser light beam, and the focusing period of the single point focusing energy is about 1 millisecond (ms) to about 0.01 milliseconds. Preferably, within this given time range, about 5 milliwatts (mW) is supplied by the single point focusing energy. In other words, the present disclosure could employ a single point heating energy smaller than about 0.01 millijoules (mJ) per pulse and each pulse is shorter than about 200 µs. Furthermore, the focal length of the energy light beam 40 is substantially shorter than or equal to half of the filter thickness t.

Therefore, irradiating the energy light beam 40 to the first patterned color layer 26a causes internal heating to localized regions of the first patterned color layer 26a such that heated regions expand and squeeze unheated regions. Upon cooling, the porous structure 42 which acts as a fluffy type is formed between the first substrate 12 and the transparent conductive layer 28 or inside the first patterned color layer 26a. In a preferred embodiment, when the first patterned color layer 26a is irradiated by the energy light beam 40, localized peeling would occur due to variations in coefficients of thermal expansion of the interface materials, forming pores upon cooling. Therefore, either an interface 48 of the first substrate 12 and the first patterned color layer 26a or an interface 50 of the first patterned color layer 26a and the transparent conductive layer 28 would result in a porous structure, or combinations thereof. In the preferred embodiment, after being irradiated by the energy light beam 40, the interface 48 of the first patterned color layer 26a and the first substrate 12, and the interface 50 of the first patterned color layer 26a and the transparent conductive layer 28 both form porous structures, as indicated by the porous structures 44, 46 of FIG. 4.

In addition, in the preferred embodiment, the repairing process of the present disclosure uses a pulsed energy light beam 40 to rapidly scan an entire first sub-pixel region 18 in sequence (or namely in turn), forming porous structures 42, 44, 46 within the first patterned color layer 26a and at the interfaces. Also, the thickness of the first patterned color layer 26a expands evenly to substantially at least half of the cell gap G. In other embodiments, the energy light beam 40 is only applied in localized sub-pixel regions or applied in a spot-like distribution behavior in the sub-pixel regions, where scanning of the entire sub-pixel region is not necessary.

As stated earlier, the method for repairing a bright point defect of the present disclosure irradiates an energy light beam 40 with a lower energy and a shorter time exposure on the first patterned color layer 26a which is contaminated by the particle 36. Using the energy light beam 40 with a low energy and a shorter time exposure prevents the changes of material properties of the first patterned color layer 26a such as burning the first patterned color layer 26a to a black color or making the patterned color layer 26a brittle. Therefore, the expanded first patterned color layer 26a would still reveal its original color (e.g. the color of the first patterned color layer 26a) and has an even and complete structure. On the other hand, the transparent conductive layer 28 and the liquid crystal alignment layer 30 are still disposed on the surface of the expanded first patterned color layer 26a. Specifically, the transparent conductive layer 28 and the liquid crystal alignment layer 30 which are disposed over the right part of the first patterned color layer 26a, the black matrix 34 and the second patterned color layer 26b, are still one consecutive thin film even after exposure to the energy light beam 40. Thereby, the transparent conductive layer 28 and the liquid crystal alignment layer 30 on the surface of the first patterned color layer 26a and the surface of the black matrix 34 exhibit an even ladder structure 52. However, under certain circumstances, fracture (not peeling) of the transparent conductive layer 28 and the liquid crystal alignment layer 30 may occur due to the expansion of the first patterned color layer 26a. Specifically, the transparent conductive layer 28 and the liquid crystal alignment layer 30 over the surface of the left hand side of the first patterned color layer 26a and the nearby black matrix 34 cause crack, break off, rend, or discontinuous. Therefore, after applying the energy light beam 40, the transparent conductive layer 28 and the liquid crystal alignment layer 30 on the surface of the first patterned color layer 26a could behave continuously, discontinuously, or a combination of both.

Figure 5:
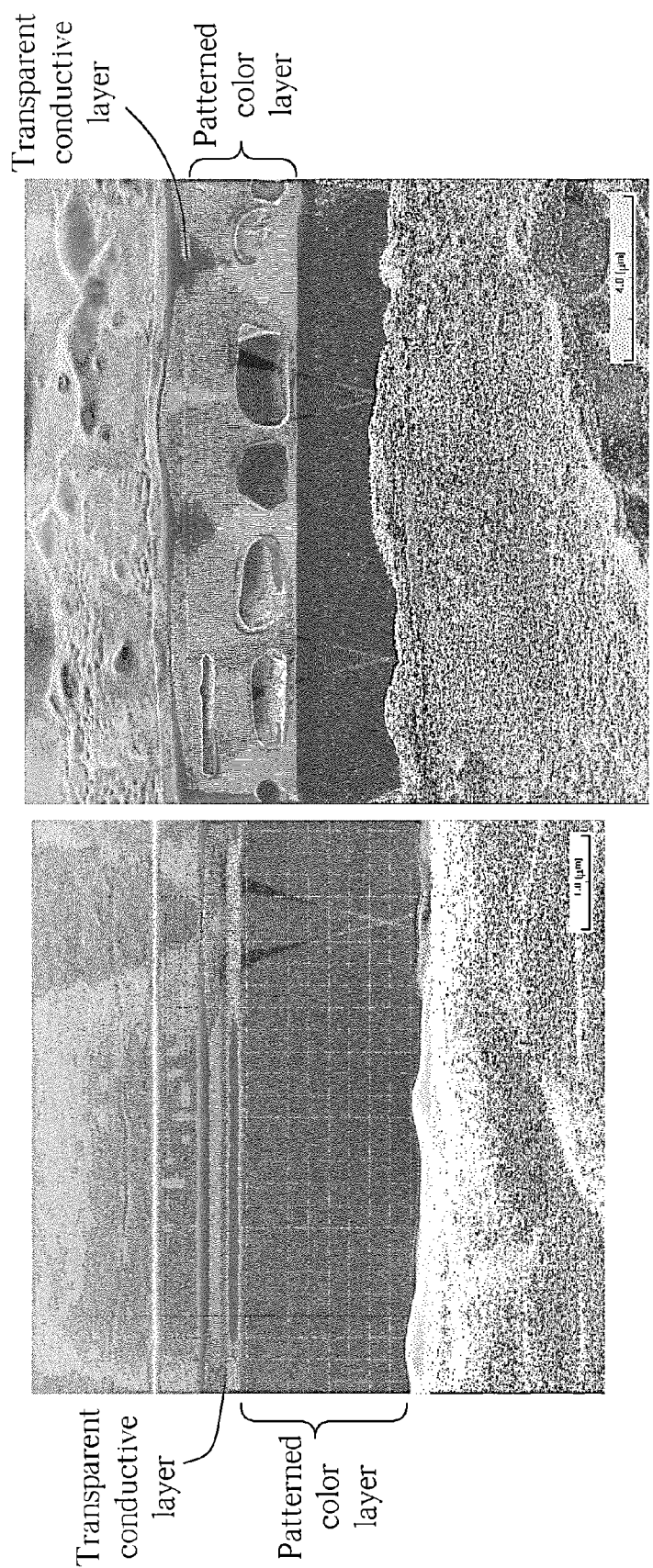
FIG. 5 is a partial cross-sectional view of a FIB image of a display panel of the present disclosure.

Referring to FIG. 5, FIG. 5 is a FIB image of a cross-sectional view of the display panel 10 of the present disclosure. The FIB image (A) on the left reveals the patterned color layer without the method of repairing of the present disclosure (with a scale bar of 1.0 μm), and the thickness of the color filter is substantially equal to 2 μm. The FIB image (B) on the right reveals the patterned color layer or a color filter which has been irradiated by the energy light beam 40 (with a scale bar of 4.0 μm). This figure reveals that the patterned color layer exhibits a porous structure after the energy light beam 40 is applied, and the thickness of the patterned color layer increases substantially to about 4 μm. As present display panel tends to have a decreased cell gap G (e.g. under about 3.5 μm), the patterned color layer with a thickness increase to about 4 μm would fill a substantial amount of the liquid crystal layer which changes the distribution of the liquid crystals in the corresponding sub-pixel regions significantly and repairs the sub-pixel regions to grey points or dark points effectively.

Figure 6:
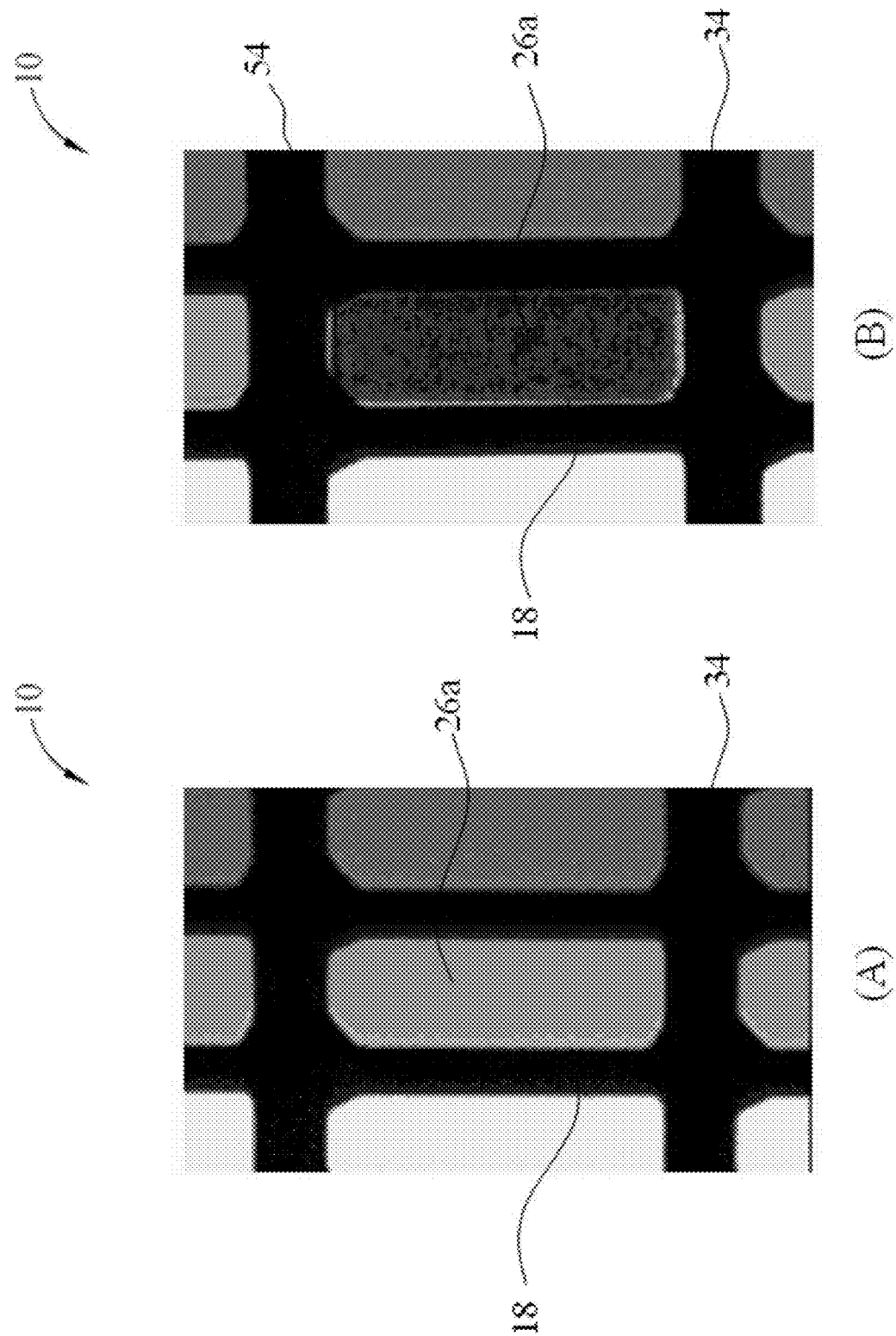
FIG. 6 is a schematic diagram of a top view of a display panel of the present disclosure.

Referring to FIG. 6, FIG. 6 is the partial top view of the display panel 10 after supplying the driving voltage, wherein the pixel region in the middle of the figure corresponds to the first sub-pixel region 18 of FIG. 4. The left image (A) reveals that after the repairing process, the color of the first patterned color layer 26a is not changed or burned into a black color; the color is similar to the color before the repairing process (e.g. similar to the color of the first patterned color layer 26a on its top and bottom). Therefore, referring to the image on the right (B) of FIG. 6, in another embodiment, the bright point repairing method of the present disclosure further includes providing a polarizer 54 on the first substrate 12 or the second substrate 14. Through the polarizer 54, whether the bright point defect at the first sub-pixel region 18 has turned to a grey point or a dark point could be observed. In other words, one cannot see whether the first sub-pixel region 18 is repaired or not without the presence of the polarizer 54. As shown in the figure, when the polarizer 54 is disposed on the surface or adhered on the surface of the display panel 10, the repaired first sub-pixel layer 18 reveals a dark or a black point which in this case, the repair is successful. The theory behind such effect is the expanded first patterned color layer 26a partially or completely fills the cell gap G which reduces a transmittance in the first sub-pixel region 18 and forms a dark or a grey point. Therefore, the adjacent pixel regions of the first sub-pixel region 18 reveal no new bright point defects caused by the contaminants formed during the repairing process. Image (B) of FIG. 6 reveals the method for repairing a bright point defect of the present disclosure which achieves significant improvements.

Figure 7:
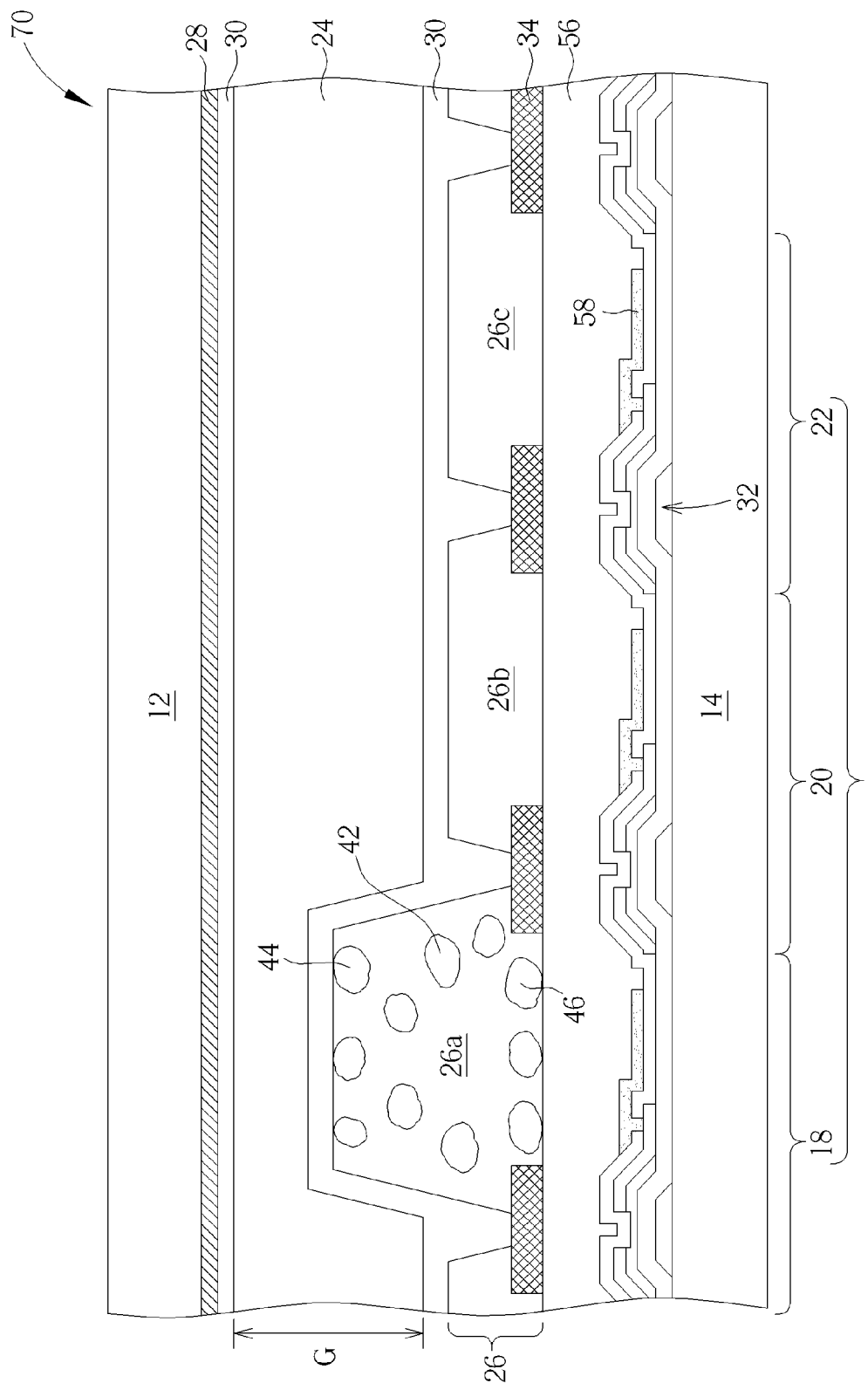
FIG. 7 is a cross-sectional view of second embodiment of a display panel of the present disclosure.

Referring to FIG. 7, FIG. 7 is a cross-sectional view of a second embodiment of the display panel of the present disclosure; those components identical with the components of FIG. 4 share the same symbols. As shown in FIG. 7, the display panel 70 of the present disclosure is a color filter on array (COA) panel with a color filter 26 disposed on an array substrate such that the color filter 26 and the transistor 32, or other array units are all disposed on the surface of the second substrate 14. The display panel 70 of the present disclosure has been repaired using the repairing process of the present disclosure. Therefore, before the repairing process, if a bright point defect is detected at the first sub-pixel region 18, the repairing process of the present disclosure would apply a short term low energy light beam to the first patterned color layer 26a, causing expansion of the first patterned color layer 26a and forming porous structures 42, 44, 46, while the thickness of the expansion is at least above half of the cell gap G. In the present embodiment, a transistor 32 and other array units are disposed between the color filter 26 and the second substrate 14 with an insulating layer 56 disposed on top. The transistors 32 are disposed at the adjacent first, second, and third patterned color layers 26a, 26b, 26c and are covered by a black matrix 34. The first substrate 12 and the second substrate 14 are disposed parallel and opposite to each other; the internal surface of the first substrate 12 has a transparent conductive layer 28 and a liquid crystal alignment layer 30 embedded respectively. However, the COA display panel of the present disclosure is not limited to the structure illustrated in FIG. 7. For example, the transistor 32 and other array units maybe disposed parallel to the color filter 26 between the neighboring first, second, and third patterned color layer 26a, 26b, and 26c, or disposed on the surface of the color filter 26, but is not limited. Please note, in order for the pixel electrode 58 to avoid the voltage dividing effect from the patterned color layer, the pixel electrodes 58 are disposed on the surfaces of the first, second, and third patterned color layers 26a, 26b, 26c and electrically connected to the transistors 32 respectively. The liquid crystal alignment layer 30 is disposed above the surfaces of the pixel electrodes 58.

Figure 8:
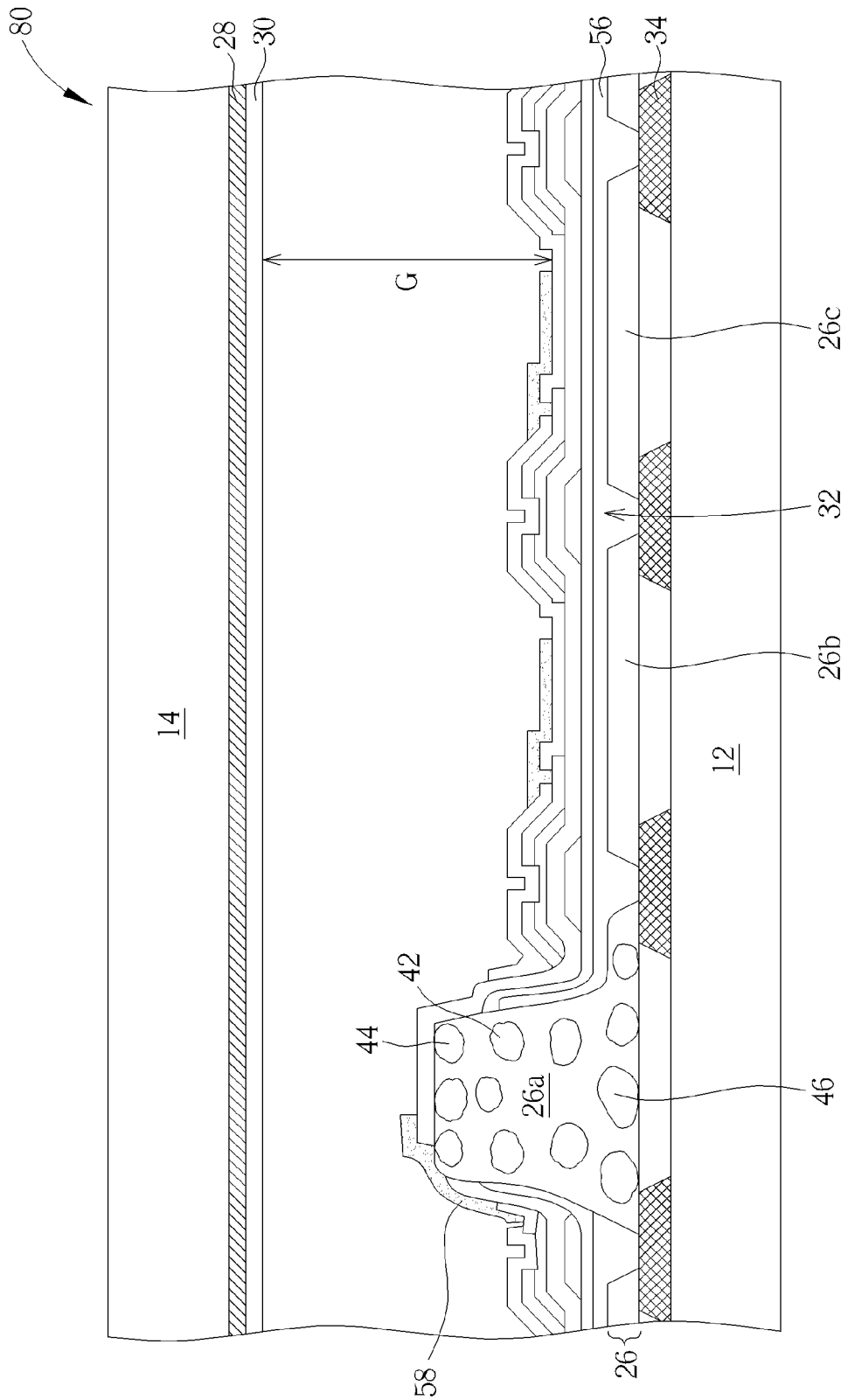
FIG. 8 is a schematic diagram of a cross-sectional view of the third embodiment of the display panel of the present disclosure.

Referring to FIG. 8, FIG. 8 is the cross-sectional view of the third embodiment of the display panel of the present disclosure; those components identical with the components of FIG. 4 share the same symbols. As shown in FIG. 8, a display panel 80 of the present disclosure is an array on array color filter (AOC) panel in which the transistors 32, or other array units are disposed on the same surface of the color filter substrate as the color filter 26, as illustrated by the first substrate 12 in the figure. In the present embodiment, array units such as the transistors 32 and the pixel electrodes 58 are disposed on the surface of the color filter 26. When the repairing process on the first pixel region 18, an energy light beam (not illustrated) scans the entire first pixel region 18 in sequence; therefore, most of the first patterned color layer 26a in the first sub-pixel region 18 expands evenly and exhibits porous structures 42, 44, 46. The thickness of the first patterned color layer 26a also expands to at least half of the cell gap G and the transistors 32 or the pixel electrodes 58 on the surface of the first patterned color layer 26a experience shape changes at the same time. However, in other embodiments, the repairing process of the present disclosure may only scan a partial region of the first sub-pixel region 18 which results in partial expansion of the first patterned color layer 26a, avoiding any shape changes to the transistor 32 at the first sub-pixel region 18. Note that the pixel structure design of the AOC display panel 80 repaired by the method of repairing a bright point is not limited to what is illustrated on FIG. 8. For instance, the transistor 32 and the color filter 26 maybe disposed in parallel to the adjacent first, second, and third patterned color layers 26a, 26b, 26c, or disposed between the color filter 26 and the first substrate 12.

Please note that the calculation on the liquid crystal layer or the electrophoretic layer described in the above embodiment could be an average of topography using high and low values of the first sub-pixel region 18, or an average of topography using higher values of the first sub-pixel region 18, or an average of topography using lower values of the first sub-pixel region 18.

Figure 9:
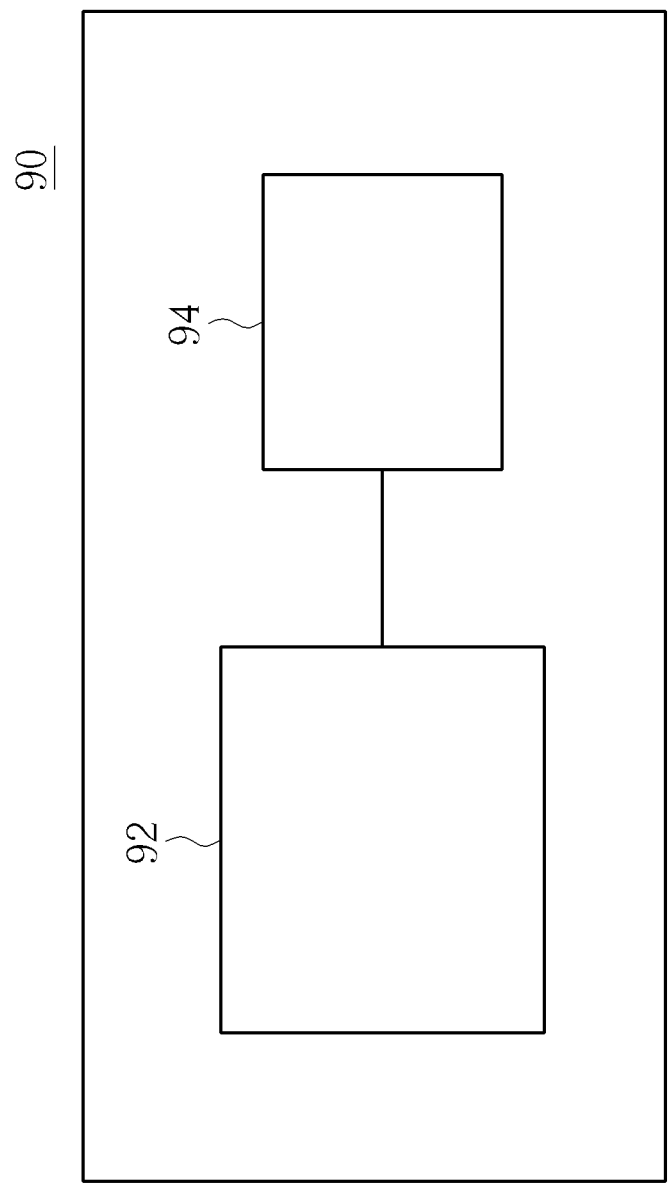
FIG. 9 is a schematic diagram of an embodiment of an optoelectronic device.

FIG. 9 illustrates a schematic diagram of an embodiment of an optoelectronic device. The optoelectronic device 90 includes a display panel 92 and an electrical unit 94 that are electrically connected to each other. The display panel 92 at least includes one of the display panels 10, 70, 80 described in the embodiments above. Since the display panel 92 is repaired using the method for repairing a bright point of the present disclosure, better result of image display is achieved. Also, migration of new bright point defects caused by the bright point repairing process is avoided. Therefore, the optoelectronic device 90 has the advantages described above.

Furthermore, according to different display modes, layer design, and display medium, the display panel 92 includes various different types. When the display medium includes liquid crystal molecules, the display panel 92 acts as a liquid crystal display panel. The liquid crystal display panels include, transparent type display panels, semi-transparent type display panels, refection type display panels, COA display panels, AOC display panels, vertical alignment (VA) display panels, in-plane switch (IPS) display panels, multi-domain vertical alignment (MVA) display panels, twist nematic (TN) display panels, super twist nematic (STN) display panels, patterned-slit vertical alignment (PVA) display panels, super patterned-slit vertical alignment (S-PVA) display panels, advance super view (ASV) display panels, fringe field switching (FFS) display panels, continuous pinwheel alignment (CPA) display panels, axially symmetric aligned microcell mode (ASM) display panels, optical compensation bended (OCB) display panels, super in plane switching (S-IPS) display panels, advanced super in-plane switching (AS-IPS) display panels, ultra fringe field switching (UFFS) display panels, polymer stable alignment display panels, electric papers, blue phase displays, dual-view display panels, triple-view display panels, three-dimensional display panels, or other display panels or combinations of above, and all of the above liquid crystal display panels are classified as non-self luminance display panels. If the display medium includes liquid crystal materials, and electroluminescent materials, such display panels are called hybrid display panels or semi-self luminance display panels. The electroluminescent materials could be organic materials, inorganic materials, or a combination of both. Moreover, molecule sizes of the materials described above are further classified into molecules, polymers, or a combination of both.

In addition, the electrical unit 94 includes a control unit, an operation unit, a process unit, an input unit, a memory unit, a driver unit, a luminance unit, a protector unit, a sensor unit, a detector unit, or other feature units, or combinations of the previously described units. In general, the optoelectronic device 90 or similar devices include portable electronics (e.g. cell phones, camcorders, notebook computers, gaming devices, watches, music players, portable media players, e-mail receivers, navigation systems, digital photo frames, and etc.), monitors, televisions, billboard displays, and display panels in overhead projectors. Furthermore, the repairing method of the optoelectronic device 90 as described earlier includes the method of repairing a bright point mentioned in previous embodiments.

In summary, the method for repairing a bright point of the present disclosure, and the display panels and optoelectronic devices manufactured with the bright point defect repairing process the following advantages. First of all, the method for repairing a bright point of the display panel of the present disclosure heats up the patterned color layer of the sub-pixel layer which causes the thickness of the patterned color layer to expand to at least half of the cell gap, lowers the transmittance of the liquid crystal layer, and turns the particular sub-pixel region into a dark point or a grey point. Moreover, the patterned color layer is not over heated during the repairing process of the present disclosure; therefore, the patterned color layer does not become brittle or burned black which avoids contamination with the liquid crystal layer and prevents formation of new bright point defects. Using the method for repairing a bright point of the display panel of the present disclosure could further reduces the problem of bright point defects as well as avoiding other defects caused by traditional repairing methods; therefore, a better image display is achieved.

Those skilled in the art will readily observe that numerous modifications and alterations of the device and method may be made while retaining the teachings of the disclosure.

What is claimed is:

1. A display panel comprising:
    a pair of substrates parallel and opposite to each other, the pair of substrates comprising at least a pixel region, the pixel region at least comprising a first sub-pixel region and a second sub-pixel region;
    a liquid crystal layer disposed between the pair of substrates, a thickness of the liquid crystal layer being defined as a cell gap;
    a color filter disposed on one of the pair of substrates, wherein the color filter at least comprises a first patterned color layer disposed in the first sub-pixel region, and a second patterned color layer disposed in the second sub-pixel region; and
    a transparent conductive layer and a liquid crystal alignment layer sequentially disposed on the color filter, wherein the first patterned color layer disposed between one of the pair of substrates and the transparent conductive layer has a porous structure, a thickness of the first patterned color layer being at least half of the cell gap and greater than a thickness of the second patterned color layer so that the transparent conductive layer disposed on the first patterned color layer holds a particle within the liquid crystal layer in the first sub-pixel region.

2. The display panel of claim 1, wherein the porous structure is disposed at either an interface of one of the pair of substrates and the first patterned color layer, or an interface of the first patterned color layer and the transparent conductive layer.

3. The display panel of claim 1, wherein the transparent conductive layer and the liquid crystal alignment layer covers a surface of the first patterned color layer, and the transparent conductive layer and the liquid crystal alignment layer form a ladder-like structure.

4. The display panel of claim 1, further comprises a plurality of array units, disposed on one of the pair of substrates.

5. An optoelectronic device, comprising the display panel of claim 1.

* * * * *